(12) United States Patent
Burch et al.

(10) Patent No.: US 8,404,756 B2
(45) Date of Patent: Mar. 26, 2013

(54) FOAMABLE FLUOROPOLYMER COMPOSITION

(75) Inventors: Heidi Elizabeth Burch, Parkersburg, WV (US); Sundar Kilnagar Venkataraman, Avondale, PA (US); Robert Thomas Young, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/446,633

(22) Filed: Apr. 13, 2012

(65) Prior Publication Data

US 2012/0199377 A1 Aug. 9, 2012

Related U.S. Application Data

(62) Division of application No. 12/775,506, filed on May 7, 2010, now Pat. No. 8,178,592.

(60) Provisional application No. 61/178,584, filed on May 15, 2009.

(51) Int. Cl.
*C08J 9/00* (2006.01)
*C08J 9/12* (2006.01)
*C08F 214/26* (2006.01)

(52) U.S. Cl. ............ 521/79; 521/81; 521/134; 521/145; 525/326.5; 525/326.2; 525/355; 525/356

(58) Field of Classification Search .................... 521/79, 521/81, 134, 145; 525/326.4, 325.2, 355, 525/356, 326.2
See application file for complete search history.

(56) References Cited

U.S. PATENT DOCUMENTS

| | | | |
|---|---|---|---|
| 4,552,925 | A | 11/1985 | Nakagawa et al. |
| 4,560,829 | A | 12/1985 | Reed et al. |
| 4,743,658 | A | 5/1988 | Imbalzano et al. |
| 4,764,538 | A | 8/1988 | Buckmaster et al. |
| 4,877,815 | A | 10/1989 | Buckmaster et al. |
| 5,179,167 | A | 1/1993 | Ishiwari et al. |
| 5,677,404 | A | 10/1997 | Blair |
| 6,583,226 | B1 | 6/2003 | Kaulbach et al. |
| 6,838,545 | B2 | 1/2005 | Chapman et al. |
| 7,638,709 | B2 | 12/2009 | Kenny et al. |
| 8,178,592 | B2 | 5/2012 | Burch et al. |
| 2002/0111433 | A1 | 8/2002 | Lee et al. |
| 2004/0198894 | A1 | 10/2004 | Abusleme et al. |
| 2008/0283271 | A1 | 11/2008 | Kenny et al. |

FOREIGN PATENT DOCUMENTS

| | | |
|---|---|---|
| EP | 0423995 B1 | 3/1998 |
| WO | 2010132350 A1 | 11/2010 |

OTHER PUBLICATIONS

International Search Report of corresponding PCT/US2012/034215 case: European Patent Office in Rijswijk, NL, Authorized Officer Rene Oudot, Oct. 5, 2010.

*Primary Examiner* — Irina S Zemel

(57) ABSTRACT

A foamable fluoropolymer composition containing foam cell nucleating agent is provided, wherein the fluoropolymer comprises melt-fabricable tetrafluoroethylene-/hexafluoropropylene copolymer and tetrafluoroethylene/perfluoro(alkyl vinyl ether) copolymer, wherein the alkyl contains 1 to 4 carbon atoms, wherein the melting temperature of said tetrafluoroethylene/perfluoro(alkyl vinyl ether) copolymer is no more than 35° C. greater than the melting temperature of said tetrafluoroethylene/hexafluoropropylene copolymer, and/or wherein said tetrafluoroethylene/hexafluoropropylene copolymer and said tetrafluoroethylene/perfluoro(alkyl vinyl ether) copolymer each have a melt flow rate (MFR) within the range of 1 to 40 g/10 min and the MFR of one of said copolymers is at least twice that of the other of said copolymers.

9 Claims, No Drawings

FOAMABLE FLUOROPOLYMER COMPOSITION

CROSS REFERENCE TO RELATED APPLICATIONS

This is a division of application Ser. No. 12/775,506 filed May 7, 2010, now U.S. Pat. No. 8,178,592, which claims priority under 35 U.S.C. 119 (e) from provisional application 61/178,584 filed May 15, 2009.

FIELD OF THE INVENTION

This invention relates to foamable fluoropolymer compositions that are especially suitable for forming the insulation in coaxial cable to be used at very high frequencies, e.g. at least 10 GHz.

BACKGROUND OF THE INVENTION

U.S. Pat. No. 4,560,829 discloses the desirability of foamed fluoropolymer insulation as the electrical insulation in cables to be used over the 3 to 18 GHz frequencies of data transmission. The use of certain blowing agents is disclosed together with melt-extrudable fluoropolymers having a loss tangent less than 0.0015 at 10 GHz is disclosed. The blowing agent is dissolved in the molten fluoropolymer within the extruder, by virtue of the pressure maintained within the extruder. This pressure is released after the molten fluoropolymer is extruded, enabling the dissolved blowing agent to come out of solution within the molten fluoropolymer to thereby form bubbles (voids) within the insulation extruded onto the conductor of the cable. The voids form as the molten polymer is solidifying to lock in the bubbles as cells within the polymer insulation, thereby forming the foamed insulation. The amount of the blowing agent present in the molten polymer is adjusted so as to remain dissolved within the extruder, but not too great so that the foaming of the insulation does not cause blowing out of the bubbles (rupturing) through the exposed surface of the insulation or the surface in contact with the conductor or internally within the thickness of the insulation to create large voids that deteriorate signal transmission performance of the cable. This rupturing is a limitation on the void content achievable in the extrusion foaming step. The melt strength of the fluoropolymer plays a role in this regard, i.e. the higher the melt strength of the fluoropolymer, the greater is the resistance to rupture and the greater is the void content that is achievable.

U.S. Pat. No. 4,764,538 discloses the desirability of dispersing boron nitride and certain inorganic salts into the fluoropolymer to act as a nucleant for the formation of the cells (voids) within the molten polymer forming the foamed insulation, whereby the expansion of the dissolved blowing agent results in the cells formed within the molten polymer being small. The nucleating agent forms the sites for the voids to form. This patent describes the melt draw-down extrusion foaming process, wherein the molten fluoropolymer containing the foam cell nucleating agent is extruded as a tube that is vacuum drawn-down into the shape of a cone, the apex of which is the location of contact with the wire passing through the guide tip of the extruder crosshead. The wall thickness of the cone decreases towards the apex as the faster-running conductor stretches (draws) the cone. The patent discloses that the dissolved gas comes out of solution in the molten fluoropolymer by virtue of the sudden drop in melt pressure as the molten fluoropolymer exits the extrusion die. The evolution of the dissolved blowing agent is delayed until the molten polymer comes into contact with the conductor so as to avoid rupture of the cone caused by the weakening of the melt strength of the molten polymer forming the cone if voids were formed within the cone, especially in its thinning wall approaching the cone apex. The dynamic nature of the foaming process is revealed by Tables II and III in the '538 patent, by foam cell size varying both with the speed of the conductor (line speed) and the length of the cone.

U.S. Pat. No. 4,877,815 discloses an additional improvement in forming foamed insulation, i.e. of smaller cell size and higher void content, using a new class of foam cell nucleating agents, thermally stable sulfonic and phosphonic acids and salts, optionally together with boron nitride and inorganic salt.

EP 0 423 995 discloses another improvement, which is to expose the fluoropolymer to fluorine treatment to react with the unstable end groups of the fluoropolymer to convert them to —$CF_3$ end groups, resulting in a reduction in dissipation factor for the fluoropolymer over the range of 100 MHz to 10 GHz. Table 1 in '995 discloses the effect of transmission frequency on dissipation factor, namely as the frequency increases from 1 MHz to 10 GHz, the dissipation factor advantage of tetrafluoroethylene/perfluoro(propyl vinyl ether) copolymer (TFE/PPVE) over tetrafluoroethylene/hexafluoropropylene copolymer (TFE/HFP) reverses itself, i.e. 0.000087 vs 0.00573 to 0.0010 vs 0.00084, respectively.

U.S. 2008/0283271 (U.S. Pat. No. 7,638,709) discloses improvement in return loss over the transmission frequency range of 800 MHz to 3 GHz by incomplete fluorination of the TFE/HFP copolymer, leaving some of the as-polymerized end groups present in the copolymer, which increases the affinity of the foamed insulation for the conductor. The effect of incomplete fluorination can be obtained by using a single TFE/HFP copolymer, or a mixture of TFE/HFP copolymers, one of which is incompletely fluorinated, which saves the need for making a special single fluoropolymer having the desired melt flow rate. Unfortunately, the dissipation factor of the mixture of TFE/HFP copolymers of Example 1 of '271 is 0.00048, which is too high for such high transmission frequencies as 10 GHz.

There remains a need for foamed insulation that is both economical to manufacture and exhibits good signal transmission properties at high frequencies such as at least 10 GHz.

SUMMARY OF THE INVENTION

The present invention satisfies this need by the unique approach in insulation foaming technology of forming the fluoropolymer portion of the foamable composition by mixing together fluoropolymers characterized by dissimilarities and discovering that these dissimilarities surprisingly contribute to improved foamed insulation on the conductor of signal transmission cable.

One embodiment of the present invention is a foamable composition comprising melt-fabricable tetrafluoroethylene (TFE)/-hexafluoropropylene(HFP) copolymer, tetrafluoroethylene(TFE)/-perfluoro(alkyl vinyl ether) (PAVE) copolymer, wherein the alkyl contains 1 to 4 carbon atoms, and foam cell nucleating agent, the melting temperature of said TFE/PAVE copolymer being no more than 35° C. greater than the melting temperature of said TFE/HFP copolymer.

The most common TFE/HFP copolymers, commonly known as FEP, have a melting temperature of 250-260° C., and the most common TFE/PAVE copolymers, commonly known as PFA, have a melting temperature of 300-310° C. It has been found that when these copolymers, having a melting temperature difference of 45° C., form the fluoropolymer portion of the composition, wherein each of the copolymers constitute a substantial portion, at least 25 wt % of the combined weight of the fluoropolymer portion, the extruded foamable composition forms aggregates of polymer at the exit of the extrusion die, resulting from copolymers phase separation and sloughing off of copolymer particles as the extrudate exits from the die. This sloughing is different in appearance than die drool formed as a ring on the die face, encircling the circumference of the extrudate and periodically being pulled away from the die face by the extrudate to form smooth lumps of polymer on the surface of the foamed insulation. The die drool comes from the low molecular weight fraction of the fluoropolymer exuding from the surface of the molten fluoropolymer as it exits the extrusion die. The sloughing encountered in the workup to the present invention is characterized by discrete aggregates of polymer forming on the die face and being spaced around the circumference of the extrudate. These aggregates are periodically carried away as small flakes from the die face by the extrudate, resulting in flaws and irregularities in the foamed insulation. This sloughing provides evidence of the immiscibility of the two different copolymers, which is accentuated by the high shear condition that is characteristic of the extrusion foaming process.

This high shear arises from the necessity that the annular die opening forming the tubular shape of molten polymer extrudate has to be small enough to maintain the molten polymer within the extruder crosshead under sufficient pressure to keep the gas (blowing agent) in solution in the molten polymer. This prevents the gas from forming bubbles either within the extruder or immediately after extrusion, i.e. the foaming is delayed until the extruded tube is drawn down into contact with the conductor. Because of the small annular die opening, the draw down ratio (DDR) for foamable compositions is much less than for the extrusion formation of unfoamed fluoropolymer insulation on a conductor. For example, the DDR of unfoamed fluoropolymer insulation is usually in the range of 80 to 100:1, while the DDR for foamable fluoropolymer compositions is less than 30:1, more often less than 20:1. DDR for foamed insulation is the ratio of the cross-sectional area of the annular die opening to the cross-sectional area of the insulation as it is formed in the conductor, prior to foaming of the insulation. The high shear accompanying the extrusion of foamable compositions causes the defect of sloughing described above.

It has been discovered that surprisingly, this sloughing defect can be mitigated by using FEP and PFA that have melting temperatures closer together, as described above.

It has also been found that surprisingly, the mixture of the different fluoropolymers according to the present invention produces a foamed structure characterized by small cells dispersed throughout the foamed insulation. While the melting temperatures of the TFE/HFP copolymer and the TFE/PAVE copolymers are closer together than would be obtained if the most common of these copolymers were combined, these melting temperatures are nevertheless different from one another, e.g. by at least 15° C. The melting temperature difference means that the TFE/PAVE copolymer will start solidifying before the TFE/HFP copolymer solidifies, all while bubbles are being formed within the fluoropolymer insulation. Rather than forming regions of cell concentration corresponding to the lower melting TFE/HFP copolymer domains within the insulation, the distribution of the cells is uniform throughout the foamed insulation.

Another embodiment of the present invention is the foamable composition comprising melt-fabricable TFE/HFP copolymer, TFE/PAVE copolymer, wherein the alkyl contains 1 to 4 carbon atoms, and foam cell nucleating agent, wherein the TFE/HFP copolymer and the TFE/PAVE copolymer each have a melt flow rate (MFR) within the range of 1 to 40 g/10 min and the MFR of one of said copolymers is at least twice that of the other of said copolymers. In this embodiment, the dissimilarities are two chemically different fluoropolymers and two different melt flow characteristics.

Another embodiment of the present invention is the combination of the above-described embodiments.

Still another embodiment of the present invention is the foamed insulation made from this compositions of these embodiments and other embodiments of the invention described herein.

DETAILED DESCRIPTION OF THE INVENTION

The essential components of the composition of the present invention will first be described, followed by description of their relationship to one another.

With respect to the TFE/HFP copolymers and the TFE/PAVE copolymers that can be used in this invention, both copolymers are melt-fabricable and fluoroplastics. They are not fluoroelastomers. By melt-fabricable is meant that each of these copolymers have melt flow properties and mechanical strength, such that individually each can be fabricated by such a common melt fabrication method as extrusion to form articles having good mechanical properties, manifested for example by an MIT flex life of at least 2000 cycles (measured in accordance with ASTM D 2176 on compression molded film 8 mils (0.21 mm) thick).

Examples of TFE/HFP copolymers that can be used in the polymer mixture used in the present invention include the copolymers of tetrafluoroethylene (TFE) with hexafluoropropylene (HFP). Additional copolymerized monomers have been added to the copolymer to improve its strength, especially stress crack resistance, as measured by MIT flex life. This effect is less important in the present invention because of the presence of the substantial amount of TFE/PAVE copolymer in the composition. In the composition of the present invention, the additional monomer is present in the TFE/HFP copolymer to improve its chemical relationship with the TFE/PAVE copolymer. Thus, the preferred additional monomer in the TFE/HFP copolymer is perfluoro(alkyl vinyl ether) (PAVE) in which the linear or branched alkyl group contains 1 to 4 carbon atoms. Preferred PAVE monomers include perfluoro(methyl vinyl ether) (PMVE), perfluoro(ethyl vinyl ether) (PEVE), and perfluoro(propyl vinyl ether) (PPVE). The preferred TFE/HFP copolymers contain about 5-17 wt % HFP, and 0.2 to 4 wt % of the additional comonomer, which is preferably PAVE such as PEVE or PPVE, the balance being TFE, to total 100 wt % for the copolymer. The preferred HFP content of the copolymer is 9 to 12 wt %. The TFE/HFP copolymers, whether or not additional comonomer is present, is commonly known as FEP.

Examples of TFE/PAVE copolymers that can be used in the present invention include copolymers wherein the PAVE is a linear or branched alkyl group contains 1 to 4 carbon atoms, such as perfluoro(ethyl vinyl ether) (PEVE) and perfluoro(propyl vinyl ether) (PPVE). These copolymers are commonly called PFA. The copolymer can be made using several PAVE monomers, such as the TFE/perfluoro(methyl vinyl ether)/perfluoro(propyl vinyl ether) (PMVE) copolymer, sometimes called MFA by the manufacturer. The TFE/PAVE copolymers have at least about 2 wt % PAVE, including when the PAVE is PPVE or PEVE, and will typically contain about 2-15 wt % PAVE, the remainder to total 100 wt % being TFE. When PAVE includes PMVE, the composition is about 0.5-13 wt % perfluoro(methyl vinyl ether) and about 0.5 to 3 wt % PPVE, the remainder to total 100 wt % being TFE.

The HFP or PAVE comonomer composition of the copolymers is determined by infrared analysis on compression molded film made from the copolymer in accordance with the procedures disclosed in U.S. Pat. No. 4,380,618 for the particular fluoromonomers (HFP and PPVE) disclosed therein. The analysis procedure for other fluoromonomers are disclosed in the literature on polymers containing such other fluoromonomers. For example, the infrared analysis for PEVE is disclosed in U.S. Pat. No. 5,677,404. HFP content in wt % is 3.2×the HFPI, wherein HFPI (HFP index) is the ratio of IR absorbance at 10.18 micrometers to the absorbance at 4.25 micrometers.

The melt fabricability of each of the copolymers can also be described in terms of melt flow rate (MFR) as measured using the Plastometer® according to ASTM D-1238-94a at the temperature which is standard for the resin (ASTM D 2116-91a for TFE/HFP copolymer and ASTM D 3307-93 for TFE/PAVE copolymer, both specifying 372° C. as the resin melt temperature in the Plastometer®). The amount of polymer extruded from the Plastometer® in a measured amount of time is reported in units of g/10 min in accordance with Table 2 of ASTM D 1238-94a. The MFR of the copolymers used in the present invention will generally be from 1 to 40 g/10 min. Melt viscosity (MV) can be calculated for MFR by the relationship 53170÷MFR in g/10 min=MV in Pa·s. Thus, the MFR range of 1 to 40 g/10 min is an MV range of $5.3 \times 10^3$ Pa·s to $21.3 \times 10^4$ Pa·s. The higher the MFR, the lower is the MV, and the more flowable is the copolymer in the molten state. In older literature, MV is often reported in poises, in which case MFR can be back-calculated from the equation: MFR (g/10 min)=531700÷MV in poises.

The third component of the composition of the present invention is the foam cell nucleating agent, which can consist of one or more compounds that are thermally stable under extruder processing conditions and are effective to cause the formation of small, uniform cell sizes when the composition is foamed. Examples of foam cell nucleating agent include those disclosed in U.S. Pat. No. 4,764,538, namely boron nitride in combination with certain thermally stable inorganic salts, which are in the form of finely divided particles, or thermally stable organic acids and salts of sulfonic acid or phosphonic acid, preferably in combination with boron nitride and a thermally stable inorganic salt as disclosed in U.S. Pat. No. 4,877,815. The above-mentioned acids and salts thereof are in the form of finely divided particles at room temperature, but melt at temperatures less than encountered in the extrusion foaming of composition of the present invention. The preferred organic acid or salt has the formula $(F(CF_2)_nCH_2CH_2$-sulfonic or phosphonic acid or salt, wherein n is 6, 8, 10, or 12 or a mixture thereof. The sulfonic acid can be referred to as TBSA (Telomer B sulfonic acid). Thus, a particular salt of TBSA can be described by identity of the salt and the number of $CF_2$ groups in the TBSA, e.g. KS-6 TBSA means the potassium salt of TBSA wherein 6 $CF_2$ groups are present in the TBSA. Another preferred organic acid and salt is the perfluoroalkanesulfonic or phosphonic acid or salt. Examples of these acids and salts are given in the following Table.

TABLE 1

| | |
|---|---|
| ZrS-10 | zirconium (+4) salt of TBSA |
| CrS-10 | chromium (+3) salt of TBSA |
| CeS-10 | cerium (+4) salt of TBSA |
| KS-10 | potassium salt of TBSA |

TABLE 1-continued

| | |
|---|---|
| HS-10 | TBSA |
| AS-10 | aluminum salt of TBSA |
| SrS-10 | strontium salt of TBSA |
| CaS-10 | calcium salt of TBSA |
| ZnS-10 | zinc salt of TBSA |
| BaS-10 | barium salt of TBSA |
| LS-10 | lithium salt of TBSA |
| FS-10 | iron (+3) salt of TBSA |
| TEAS-10 | triethylamine salt of TBSA |
| BS-6A | barium p-(perfluoro[1,3-dimethylbfutyl]) benzene sulfonate |
| BS-9A | barium p-(perfluoro[1,3,5-trimethylhexyl]) benzene sulfonate |
| BaS-A1(H) | barium p-toluene sulfonate |
| BaP-A | barium benzene phosphonate |
| NaP-A | sodium benzene phosphonate |
| NaS-A(II) | 4,5-dihydroxy-m-benzene disulfonic acid disodium salt |
| NaS-6 | sodium salt of TBSA |
| BS-6 | barium salt of TBSA |
| BS-8 | barium salt of TBSA |
| KS-6 | potassium salt of TBSA |
| KS-8 | potassium salt of TBSA |
| KS-8C | potassium perfluorocyclohexylethane sulfonate |
| NaS-1 | sodium trifluoromethane sulfonate |
| KS-1 | potassium trifluoromethane sulfonate |
| KS-1(H) | potassium methane sulfonate |
| BaS-3(H) | barium propane sulfonate |
| NaTCA | sodium trichloroacetate |

Examples of inorganic salts include carbonates, tetraborates, phosphates, and sulfates of such cations as lithium, sodium, potassium, and calcium. The preferred inorganic salt is calcium tetraborate.

Another component of the composition of the present invention is the composition within the extruder wherein blowing agent is injected into the molten mass of the composition and becomes dissolved therein because of the higher pressure within the extruder. Examples of blowing agents include the inert gases nitrogen, argon, neon, and carbon dioxide. The amount of inert gas present is that which is effective to produce the void contents to be described hereinafter. Chemical blowing agent can be used, but the inert gas blowing agent is preferred.

The amount of each copolymer present in the composition of the present invention is preferably at least 25 wt %, based on the combined weight of the TFE/HFP copolymer and TFE/PAVE copolymer. On the same basis, the preferred amount of TFE/PAVE copolymer is preferably 50 to 75 wt %, whereby the TFE/HFP copolymer content would be 25 to 50 wt %. Most preferably, the amount of TFE/PAVE copolymer is greater than the amount of TFE/HFP copolymer present in the composition, and up to 75 wt %, based on the combined weight of the two copolymers. The presence of the substantial amount of both copolymers in the composition provides both processing and application benefits, but gives rise to the problem of sloughing of the composition at the exit of the extrusion die, which is alleviated by the matching of melt temperatures as will be described hereinafter.

The amount of foam cell nucleating agent present in the composition is preferably that which is effective to produce the void content desired, 20-65%, preferably 35 to 65% in the foamed insulation. Generally this amount will be 0.01 to 1 wt % based on the total copolymer content of the composition. The proportions of the components of the foam cell nucleating agent are adjusted to obtain the cell size desired, generally about 50 micrometers and smaller. The small size of the cells, their dispersion throughout the foamed insulation cell size, and the amount of void content contribute to low return loss by not reflecting back transmitted signals along the coaxial cable.

The incorporation of the foam cell nucleating agent into the copolymer composition renders it foamable in an extrusion process in the present of either gas injection into the polymer melt or the addition of chemical blowing agent to the melt. The foam cell nucleating agent is incorporated into the copolymer composition either by blending with one or both of the copolymers the form of a powder for pelletizing, so that the pellets include the foam cell nucleating agent mixed with the one or both of the copolymers, or with the copolymer pellets for co-feeding into the extruder. If both copolymers are not included in the foam cell nucleating agent-containing pellets, the pellets of the copolymer not present can be added to the copolymer pellets containing the foam cell nucleating agent in the desired amount as the feed to the extruder.

It is preferred that the melting temperatures of the copolymers are close together, preferably differing by no more than 30° C., more preferably by no more than 25° C. TFE/PAVE copolymer is the higher melting copolymer. Proximity of the melting temperatures of the TFE/HFP copolymer and the TFE/PAVE copolymers used together in the composition of the present invention avoids sloughing of the extrudate of the composition as it exits the extrusion die. The sloughing of the extrudate is a manifestation of the composition segregating as a result of the high shear of the composition in the narrow opening through which the extrudate is being forced under high pressure. Unexpectedly, when the melting temperatures of the copolymers are closer together than would be obtained by selecting the most common TFE/PAVE and TFE/HFP copolymers, this sloughing does not occur. Preferably, the TFE/HFP copolymer has a melting temperature of 255 to 265° C. and the TFE/PAVE copolymer has a melting temperature of 280 to 295° C. The melting temperatures disclosed herein are the second melting temperature (peak temperature) of the individual copolymers, determined using DSC (differential scanning calorimeter) in accordance with the procedure in ASTM D 3418, and are characterized as having a melting endotherm of at least 3 J/g.

Change in melting temperature for the TFE/HFP copolymers and TFE/PAVE copolymers used in the present invention primarily denotes a difference in composition of the copolymer, i.e. as the HFP and PAVE comonomer contents of the copolymers increase, the melting temperature of the copolymer decreases. The PAVE monomer is much more expensive than both the TFE and HFP monomers. Thus, a low melting temperature PFA represents a high cost PFA. Nevertheless, it is this TFE/PAVE copolymer, having a melting temperature of 280 to 295° C., that is preferred for use in the present invention.

MFR of the TFE/HFP copolymers and TFE/PAVE copolymers used in the present invention is primarily established by the molecular weight of the copolymer obtained in the polymerization process. The lower the molecular weight, the higher is the MFR. Preferably, the MFR of the copolymers of the present invention differ from one another by a factor of at least 2x, i.e. the MFR of one of the copolymers, preferably TFE/HFP copolymer, is at least 2x that of the MFR of the other copolymer, preferably TFE/PAVE copolymer. More preferably, the TFE/PAVE copolymer has the lower MFR, e.g. having an MFR of no greater than 15 g/10 min, preferably no greater than 10 g/10 min, and the TFE/HFP copolymer has an MFR of at least 20 g/10 min, preferably at least 24 g/10 min, and most preferably at least 28 g/10 min.

Surprisingly, and notwithstanding that the TFE/HFP and TFE/PAVE copolymers are chemically different from one another, the high MFR TFE/HFP copolymer increases both the melt flowability of the composition in the extrusion foaming process and the foamability of the composition to form the foamed insulation. TFE/PAVE copolymer is well known to have a substantially higher melt strength than TFE/HFP copolymer at the same MFR. This melt strength difference is accentuated by the preferred TFE/PAVE copolymer having the low MFR and the preferred TFE/HFP copolymer having the high MFR. The higher the melt strength, the more resistant is the molten polymer to foaming. Nevertheless, the composition of the present invention acts more like the TFE/HFP copolymer by itself than the TFE/PAVE copolymer by itself in both ease of extrudability and extent of foaming. These benefits are measured as higher than expected line speeds in the extrusion foaming process and higher than expected void contents in the foamed insulation. Notwithstanding the difference in chemical identities of the two copolymers, with the TFE/PAVE copolymer having the higher melting temperature and preferably having the lower MFR, the cell structure formed within the foamed insulation is characterized by small cell sizes and uniform distribution of the cells throughout the insulation. The cells (voids) do not form clusters within the foamed insulation as would be expected from the presence of the more easily foamable lower melting, higher MFR TFE/HFP copolymer.

The copolymers used in the composition of the present invention also preferably have a compositional relationship. In this regard, it is preferred that these copolymers have a common comonomer in addition to the TFE. Since TFE/PAVE already has PAVE comonomer, it is therefore preferred that PAVE comonomer also be present in the TFE/HFP copolymer. Most preferably the PAVE comonomer is the same in each copolymer. It has been found that for this compositional relationship to be effective, the common comonomer present in each copolymer has to be present in an effective amount. The effect of the common comonomer is to alleviate the sloughing that can occur when the composition is extruded in the extrusion foaming process. In the most preferred composition, the PAVE content of the TFE/PAVE copolymer is sufficiently high that it is effective to provide the needed composition matching between the copolymers to prevent extrusion sloughing. The TFE/PAVE copolymers having a melting temperature of about 305° C. generally have 4 wt % and less of the PAVE comonomer. As the PAVE content is increased, the melting temperature decreases, and this PAVE increase in the TFE/PAVE copolymer is the preferred way for providing the low melting temperature TFE/PAVE copolymer used in the present invention to be within 35° C. or less than the melting temperature of the TFE/HFP copolymer. Preferably, the TFE/PAVE copolymer used in the present invention contains at least 6 wt % PAVE.

For optimum signal transmission properties from cable wherein the composition of the present invention forms the foamed insulation around the central conductor of the cable, as in coaxial cable, it is preferred that both copolymers have stable end groups, especially the —$CF_3$ end groups. Such end groups can be obtained as a result of the copolymerization process, wherein the initiator contains the —$CF_3$ group. More common, however, is the use of the aqueous dispersion copolymerization process, wherein the end groups resulting from such polymerization include —COF, —$CONH_2$, —$CH_2OH$, and —COOH, and these end groups can be converted to —$CF_3$ end groups by fluorine treatment of the as-polymerized copolymer, such as disclosed in U.S. Pat. Nos. 4,743,658 and 6,838,545. This fluorination treatment is carried out on the copolymer prior to blending with the foam cell nucleating agent. According to one embodiment of the present invention, no more than 20 unstable end groups/$10^6$ carbon atoms are present in both copolymers, preferably no more than 6 such end groups/$10^6$ carbon atoms.

According to another embodiment of the present invention, either or both of the copolymers contains a moderate amount of the as-polymerized unstable end groups described above to increase the affinity of the foamed insulation for the conductor so that the composition exhibits a strip force, preferably at least 3 lbf (13.3 N), to provide good and consistent adhesion between the foamed insulation and the conductor. Strip force is the force necessary to break the adhesive bond between the foamed insulation and the conductor and is determined as disclosed hereinafter. Each of the copolymers when made by aqueous dispersion copolymerization has greater than 400 end groups/$10^6$ carbon atoms. The moderate amount of unstable end groups is preferably 30 to 120 unstable end groups/$10^6$ carbon atoms, provided by one or both of the copolymers. This moderate amount of unstable end groups is obtained by incomplete fluorination of the as-polymerized copolymer, as compared to fluorination that provides no more than 20 unstable end groups/$10^6$ carbon atoms. It is preferred that only one of the copolymers is incompletely fluorinated, whereby one of the copolymers will contain 30 to 120 unstable end groups/$10^6$ carbon atoms, while the other copolymer will contain no more than 20 unstable end groups/$10^6$ carbon atoms, preferably no more than 6 such end groups/$10^6$ carbon atoms. In each case, the remaining number of end groups are —$CF_3$.

The process of the present invention comprises forming a composition comprising melt-fabricable tetrafluoroethylene/-hexafluoropropylene copolymer, tetrafluoroethylene/perfluoro(alkyl vinyl ether) copolymer, wherein the alkyl contains 1 to 4 carbon atoms, foam cell nucleating agent, and blowing agent melt draw-down extruding said composition through an extrusion die onto a conductor to form insulation on said conductor, said melt draw-down extruding forming a cone of said composition in the molten state extending from said die to the formation of said insulation on said conductor, wherein the melting temperature of said tetrafluoroethylene/perfluoro(alkyl vinyl ether) copolymer being no more than 35° C. greater than the melting temperature of said tetrafluoroethylene/hexafluoropropylene copolymer and being effective to prevent sloughing from the extrudate (cone), and/or wherein said tetrafluoroethylene/hexafluoropropylene copolymer and said tetrafluoroethylene/perfluoro(alkyl vinyl ether) copolymer each have a melt flow rate (MFR) within the range of 1 to 40 g/10 min and the MFR of one of said copolymers is at least twice that of the other of said copolymers, said blowing agent causing said molten composition to foam on said conductor. Another embodiment of the present invention is the foamed insulation made by this process.

Preferably, the melt draw-down extrusion is carried out at a draw down ratio (DDR) of no greater than 30:1 and the axial length of said cone is at least 1 in (2.54 cm). Preferably, the insulation will have a void content of 35 to 65%, more preferably, 45 to 60%. It is also preferred that the insulation is at least 20 mils (0.5 mm) thick. These preferences define some of the unique extrusion characteristics of the composition of the present invention. The cone length, preferably at least 2 in (5.08 cm) that can be achieved with the composition of the present invention promotes a higher level of foaming, while providing intimacy of the foamed insulation with the conductor, resulting in reduced return loss. It is unexpected that such long cone length can be achieved in view of the differences in chemical composition, MFR, or both, with respect to the two copolymers present in the composition. In other words, the long cone length provides improvement notwithstanding the disparate nature of the copolymers of the composition. The effect of this disparate nature is evidenced when the insulation wall thickness is too small. At 50% void content, the 20 mil (0.5 mm) thickness of the foamed insulation corresponds to 12 mils if the insulation were unfoamed. As the wall thickness decreases from 12 mils (0.3 mm) (unfoamed basis), the molten copolymer cone tends to rupture, creating openings in the foamed insulation. The low draw-down ratio, preferably no greater than 20:1, tends to provide thin walled cones of molten copolymer. Rupture of the cone can be avoided by slowing down the line speed, resulting in a loss of productivity. It is therefore preferred that the insulation wall thickness, on an unfoamed basis, which is the wall thickness of the insulation initially formed on the conductor just prior to foaming to expand the insulation wall thickness, is at least 12 mils (0.3 mm).

While line speed is a concern in the production of foamed insulation by the process of the present invention, the line speed is low as compared to line speeds achievable for melt draw down extrusion coating of conductor to form thin-walled unfoamed (solid) primary insulation of TFE/HFP copolymer, e.g. 10 mil (0.25 mm) thick, depending on electrical requirements of the application for the insulated wire. As insulation uniformity and conductor concentricity requirement increase, line speed has to be decreased to satisfy the more rigorous signal transmission requirements. Nevertheless, the line speed for such solid copolymer insulation can be at least 1000 ft/min (305 m/min) to satisfy the range of signal transmission requirements. In contrast, the line speed for melt draw-down extrusion to form thick foamed insulation is generally less than 300 ft/min (91.4 m/min). For example, heretofore, the formation of 40 mil (1.0 mm) thick foamed insulation having a void content of 50%, could be carried out at a line speed of no more than about 150 ft/min (45.7 m/min).

The present invention is especially useful as the foamed insulation on coaxial cable, wherein the thickness of the foamed insulation is at least 20 mils thick, preferably at least 30 mils thick.

Cable using the foamed insulation made from the composition of the present invention exhibits very favorable signal transmission properties. The dissipation factor for the composition of the present invention is preferably no greater than 0.00032, preferably no greater than 0.00030 at 10 GHz. The foamed insulation also exhibits very favorable properties at lower frequencies. For example, the return loss over the range of 800 MHz to 3 GHz is no greater than −26 dB. For return loss of the insulation, the higher the negative number, the better (smaller) is the return loss. Just the opposite is true in the measurement of attenuation, measured in dB/100 ft (30.5 m), of the cable. The smaller the negative number, the better (smaller) is the attenuation. For 40 mil (1 mm) thick insulation having a void content of 45%, the attenuation improvement for insulation made from composition of the present invention steadily increases over the attenuation of foamed insulation of the same thickness and void content made from a blend of TFE/HFP copolymers in accordance with US 2008/-0283271 (see Example 3). Cables made from foamed insulation of the composition of the present invention preferably have an attenuation that is no greater than −22 dB/100 ft (30.5 m) at 3 GHz.

EXAMPLES

Two TFE/PAVE copolymers are used in the Examples, as follows:

PFA A is a copolymer of TFE and 3.7 wt % PPVE having an MFR of 5.4 g/10 min, which has been subjected to fluorine treatment so as to have —CF3 end groups replacing unstable end groups, with no more than a total of 6 such end groups, as described above, remaining in the copolymer. This copolymer has a melting temperature of 305° C.

PFA B is a copolymer of TFE and 7.3 wt % PEVE having an MFR of 6.6 g/10 min, which has been subjected to fluorine treatment so as to have —CF3 end groups replacing unstable end groups, with no more than a total of 6 such end groups, as described above, remaining in the copolymer. This copolymer has a melting temperature of 288° C.

The TFE/HFP copolymer used in these Examples contains 10 to 11 wt % HFP and 1-1.5 wt % PEVE, the remainder being TFE. This FEP has an MFR 30 g/10 min and has about 50 wire affinity end groups per $10^6$ carbon atoms, these wire affinity end groups, primarily —COOH, arising from the polymerization process. The remaining end groups are the stable —$CF_3$ end group obtained by fluorination of the FEP. The extruder fluorination procedure of Example 2 of U.S. Pat. No. 6,838,545 (Chapman) is used except that the fluorine concentration is reduced from 2500 ppm in the '545 Example to 900 ppm.

The foam cell nucleating agent is a mixture of 91.1 wt % boron nitride, 2.5 wt % calcium tetraborate and 6.4 wt % of the barium salt of telomer B sulfonic acid, to total 100% of the combination of these ingredients, as disclosed in U.S. Pat. No. 4,877,815 (Buckmaster et al.). This agent is provided as a 4 wt % concentrate in the FEP described in the preceding paragraph, based on the total weight of the concentrate.

To form a foamable PFA/FEP composition, extruded pellets of the foam cell nucleating agent concentrate are dry blended with pellets of the PFA and FEP and then subjected to the extrusion wire coating/foaming process.

Return loss is determined on a 1000 ft (305 m) length of coaxial cable by measuring signal loss in both directions along the cable and averaging the two measurements. The signal loss is measured at 1601 frequencies uniformly spaced apart in a sequential frequency sweep from 0 MHz to 4.5 GHz and the return losses from this sweep are averaged to obtain the average return loss over this range of frequencies. An Agilent Technologies Network Analyzer can be used to make these measurements and provide readout of the average return loss. The same Analyzer is used to measure attenuation on 100 ft (30.5 m) lengths of cable.

Strip force is the force necessary to break the adhesive bond between the foamed insulation of the coaxial cable and the wire conductor and is determined on a length of coaxial cable consisting of 3 in (7.6 cm) of the coaxial cable and 1 in (2.5 cm) of copper conductor with the foamed insulation and overlying outer conductor stripped away. The wire conductor is copper since that is the most common wire conductor material. This length of coaxial cable is placed in a slot within a stationary metal plate, the slot being wide enough to accommodate the central conductor pointing downwardly, but not to permit passage of the portion of the coaxial cable containing the foamed insulation and outer conductor through the slot. The downwardly extending copper conductor is gripped by a jaw of an INSTRON® tensile testing machine and the jaw is moved away from the slot at a rate of 2.5 cm/min. The strip force is the force causing the foamed insulation to breakaway from the copper conductor so that the conductor can then be pulled from the foamed insulation. This test is carried out at ambient temperature (15° C. to 20° C.), and the temperature of the wire conductor at which the foamable composition is applied to the conductor is no greater than about 200° F. (93° C.).

Void content of the foamed insulation is calculated from the equation:

$$\text{Void Content (\%)} = 100 \times (1 - d_{(foamed)}/d_{(unfoamed)}).$$

The density of the foamed insulation is determined by cutting a length of insulated conductor, removing the insulation, calculating the volume in cubic centimeters of the insulation and dividing that value into the weight in grams of the insulation. The density is the average of measurements of at least 5 samples, each being ~30 cm in length. The density of the unfoamed insulation is 2.15 g/cm$^3$.

Dissipation factor is measured on compression molded plaques in accordance with ASTM D 2520 as disclosed in EP 0 423 995.

Example 1

A dry blend of 56 parts by weight of PFA B and 44 parts by weight of the FEP, together with foam cell nucleating agent concentrate is formed wherein the wt % of the nucleating agent is 0.30 wt %, based on the total weight of the composition. The MFR of the blend is 11.9 g/10 min. The extrusion foaming conditions are conventional. The extruder is injected with nitrogen gas at high pressure. The draw down ratio (e.g. DDR, in a tubular die, is defined as the ratio of the cross-sectional area of the annular die opening to the cross-sectional area of the finished insulation) of the extruded fluoropolymer composition is about 7 and the temperature of the copper conductor is ambient temperature, i.e. no pre-heat is applied. The extrusion conditions are such that the foaming is delayed until the extruded polymer is in contact with the copper conductor. The length of the molten copolymer cone is 2 in. (5.08 cm). The line speed of the extrusion foaming process is 145 ft/min (44.2 m/min). There is no formation of flakes on the die face during the extrusion foaming run.

The foam insulated wire is then formed into a coaxial cable by conventional procedure, including the braiding of strips of conductive metal over the foamed insulation to form the outer conductor and the application of a polymer jacket over the outer conductor. The dimensions of the coaxial cable are 0.0228 in (0.58 mm) diameter central conductor and outer foam diameter of 0.1020 in (2.6 mm), whereby the thickness of the foamed insulation is about 0.040 in (1.0 mm). The void content of the foamed insulation is 47%. The composition of the foamed insulation exhibits a dissipation factor of 0.0003 at 10 GHz.

This coaxial cable exhibits a return loss of −30 dB at 1 GHz, and the strip force required to break the adhesion between the foamed insulation and the central conductor is 6 lbf (25.5 N). Similar results are obtained when the foam cell nucleating agent is mixed directly with the PFA B/FEP composition to be extrusion foamed, rather than using a polymer concentrate of the foam cell nucleating agent.

The composition exhibits a dissipation factor at 10 GHz of 0.0003 and the cable made fro the foamed composition as its insulation exhibits an attenuation at 3 GHz of −22.5 dB/100 ft (30.5 m). The foamed insulation exhibits a capacitance of 16.8 pf/ft, (55.1 pf/m) indicating a highly foamed structure.

Example 2

In this Example, a different cable is made, the conductor having a diameter of 0.0183 in (0.46 mm) and an outer diameter for the foamed insulation of 0.074 in (1.88 mm), the thickness of the foamed insulation being 0.0279 in (0.71 mm). Three foamable compositions are prepared for separate extrusion foaming to form this insulation, as follows:

Composition 1: The same as in Example 1.

Composition 2: The same as in Example 1 except that PFA B is replaced by PFA A.

Composition 3: A melt blend of the FEP copolymers of Example 1 of US 2008/0283271 (U.S. Pat. No. 7,638,709), except that FEP A (MFR 7 g/10 min)) and FEP B (MFR 30 g/10 min) proportions are 60 wt % and 40 wt %, respectively to match the MFR of Composition 1, resulting in an MFR for Composition 3 of 12.2 g/10 min.

Compositions 1 and 2 are capable of being melt draw-down extrusion foamed at a line speed of 360 ft/min (109.7 m/min), while for composition 3, the line speed can be no more than 310 ft/min (94.5 m/min).

The extrusion foaming of Composition 1 produces a high void content of 49.5%, and cable attenuation at 1 GHz of −18.8 dB/100 ft (30.5 m).

The extrusion foaming of Composition 2 is accompanied by sloughing off of polymer to form aggregates on the die face spaced from each other and around the extrudate, which are periodically carried away by the extrudate to form rough particles adhered to and extending from the exposed surface of the foamed insulation, whereby the resultant foamed insulation is unacceptable. The void content for this foamed insulation is only 44.5% and the attenuation of the cable is −19.2 dB/100 ft (30.5 m).

The extrusion foaming of Composition 3 produces a void content of 46.2% and the cable attenuation is −19.6 dB/100 ft (30.5 m). The extrusion foaming of Composition 1 can be carried out at a greater line speed than when Composition 3 is used, and produces better signal transmission (attenuation) results.

The extrusion foaming of Compositions 1 and 3 is not accompanied by sloughing as occurs in the extrusion foaming of Composition 2.

Example 3

In this Example, signal transmission results are compared for a cable wherein the foamed insulation has a void content of 45% and the thickness of the foamed insulation is 0.040 in (1.0 mm). The comparison is between the foamed insulation made from the composition of Example 1 of the present specification and the foamed insulation made from the composition of Example 1 of US 2008/0283271 (U.S. Pat. No. 7,638,709), except that the concentration of the foam cell nucleant is 0.3 wt %. The attenuation of the cable of Example 1 of the present specification is better than that for the all FEP foamed insulation over the entire measured range of 800 MHz to 4.5 GHz. Thus, at 1000 MHz, 2 GHz, 3 GHz, and 4 GHz, the attenuation improvement is 1 dB/100 ft (30.5 m), 2 dB/100 ft (30.5 m), 3 dB/100 ft (30.5 m), and 4 dB/100 ft, respectively, for the present invention. At 3 GHz, for example, the attenuation of the cable made from insulation of the present invention is −21.5 db/100 ft (30.5 m) as compared to −23.5 dB/100 ft (30.5 m) for the TFE/HFP copolymer blend composition of '271 Example 1.

The invention claimed is:

1. Process for forming insulation onto a conductor comprising:
    forming a composition by blending together a first copolymer comprising tetrafluoroethylene, hexafluoropropylene, and perfluoro(alkyl vinyl ether) and a second copolymer consisting essentially of tetrafluoroethylene and perfluoro(alkyl vinyl ether), wherein the alkyl contains 1-4 carbon atoms, with foam cell nucleating agent and a blowing agent;
    melt draw down extruding the composition from an extrusion die onto the conductor to form the insulation on the conductor, the melt down extruding forming a cone of the composition in a molten state extending from the die to the formation of the insulation on the conductor, wherein the melting temperature of the second copolymer is no more than 35° C. greater than the melting temperature of the first copolymer, and/or wherein the first copolymer and the second copolymer each have a melt flow rate (MFR) within the range of 1 to 40 g/10 min and the MFR of one of the first and second copolymers is at least twice that of the other copolymer, the blowing agent causing the molten composition to foam on the conductor.

2. The process of claim 1, wherein the melt draw down is at a draw down ratio of no greater than 30:1 and the cone has an axial length of at least 1 inch and wherein the foaming of the composition on the conductor provides the insulation having a void content of 35 to 65%.

3. The process of claim 1, wherein the insulation has a thickness of at least 20 mils.

4. Foamed insulation made by the process of claim 1.

5. The process of claim 1, wherein the first copolymer comprises from about 5 to 17 weight percent of the hexafluoropropylene, about 0.2 to 4 weight percent of the perfluoro (alkyl vinyl ether), and the balance the tetrafluoroethylene.

6. The process of claim 1, wherein the perfluoro(alkyl vinyl ether) of the first copolymer comprises a monomer selected from the group consisting of perfluoro(methyl vinyl ether), perfluoro(ethyl vinyl ether), and perfluoro(propyl vinyl ether).

7. The process of claim 1, wherein the second copolymer contains at least about 2 weight percent of the perfluoro(alkyl vinyl ether) and the balance the tetrafluoroethylene.

8. The process of claim 7, wherein the second copolymer contains from about 2 to 15 weight percent of the perfluoro (alkyl vinyl ether) and the balance the tetrafluoroethylene.

9. The process of claim 1, wherein the perfluoro(alkyl vinyl ether) of the second copolymer comprises a monomer selected from the group consisting of perfluoro(ethyl vinyl ether) and perfluoro(propyl vinyl ether).

* * * * *